(12) United States Patent
Chiang

(10) Patent No.: US 9,047,546 B2
(45) Date of Patent: Jun. 2, 2015

(54) METHOD OF MONEY TRANSFER VIA A MOBILE PHONE HAVING SECURITY CODE GENERATOR

(76) Inventor: Kuo-Ching Chiang, New Taipei (TW)

( * ) Notice: Subject to any disclaimer, the term of this patent is extended or adjusted under 35 U.S.C. 154(b) by 0 days.

(21) Appl. No.: 13/466,153

(22) Filed: May 8, 2012

(65) Prior Publication Data

US 2013/0299592 A1 Nov. 14, 2013

(51) Int. Cl.
| | | |
|---|---|---|
| G06K 19/06 | (2006.01) | |
| G06K 19/00 | (2006.01) | |
| G06K 19/073 | (2006.01) | |
| G06Q 20/32 | (2012.01) | |
| G06Q 20/10 | (2012.01) | |
| G06Q 20/20 | (2012.01) | |
| G06Q 20/34 | (2012.01) | |
| G06Q 20/18 | (2012.01) | |
| G06K 19/07 | (2006.01) | |

(52) U.S. Cl.
CPC .......... *G06K 19/07309* (2013.01); *G06Q 20/32* (2013.01); *G06Q 20/1085* (2013.01); *G06Q 20/327* (2013.01); *G06Q 20/20* (2013.01); *G06Q 20/3226* (2013.01); *G06Q 20/341* (2013.01); *G06Q 20/3278* (2013.01); *G06Q 20/18* (2013.01); *G06Q 20/34* (2013.01); *G06K 19/0723* (2013.01)

(58) Field of Classification Search
CPC .......... G06Q 20/3278; G06Q 20/3226; G06Q 20/327; G06Q 20/353; G06Q 20/341; G06Q 20/34; G06Q 20/32; G06Q 20/1085; G06Q 20/18; G06Q 20/20; G06K 19/0723; H04L 63/0838
USPC ................................... 235/487, 492
See application file for complete search history.

(56) References Cited

U.S. PATENT DOCUMENTS

| | | | | |
|---|---|---|---|---|
| 2004/0085002 | A1* | 5/2004 | Pearce | 310/339 |
| 2005/0055581 | A1* | 3/2005 | Larsen | 713/202 |
| 2006/0200410 | A1* | 9/2006 | Kelley et al. | 705/43 |
| 2008/0014867 | A1* | 1/2008 | Finn | 455/41.1 |
| 2009/0063340 | A1* | 3/2009 | Chiang | 705/41 |
| 2009/0159688 | A1* | 6/2009 | Mullen et al. | 235/487 |
| 2011/0016047 | A1* | 1/2011 | Wu et al. | 705/43 |
| 2012/0143707 | A1* | 6/2012 | Jain | 705/18 |
| 2013/0092741 | A1* | 4/2013 | Loh et al. | 235/492 |

* cited by examiner

*Primary Examiner* — Thien M Le
*Assistant Examiner* — Claude J Brown
(74) *Attorney, Agent, or Firm* — Muncy, Geissler, Olds & Lowe, P.C.

(57) ABSTRACT

A transaction card comprises a substrate having an IC. An interface is coupled to the IC for signal transmission; a security code generator is coupled with the IC to generate a security code for banking transaction; an electricity generating button is coupled to the security code generator to generate the security code, a display is on the substrate and is coupled to the IC for displaying the security code. The electricity generating button includes piezoelectric material to generate electricity by piezoelectricity. The interface is contactless or contact type. The display is electronic paper, OLED, FED.

11 Claims, 1 Drawing Sheet

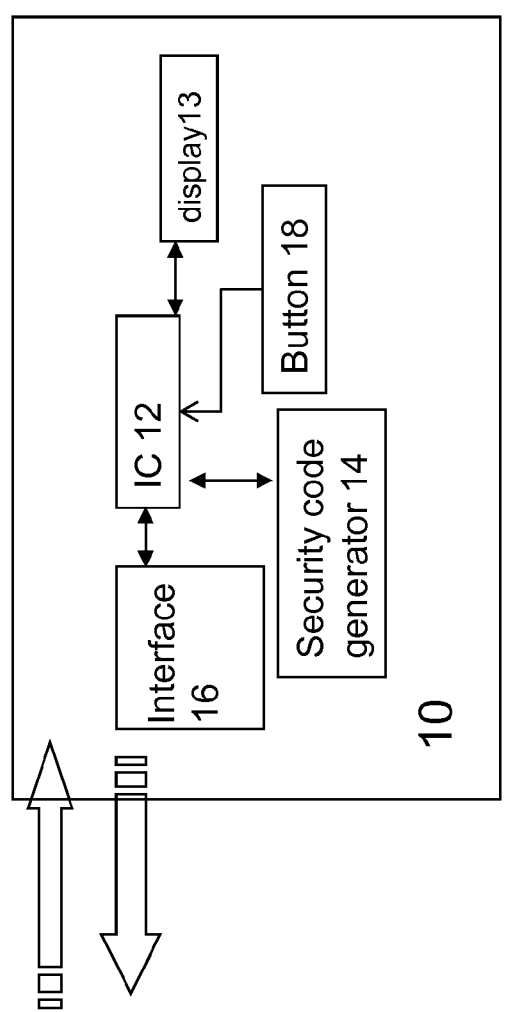
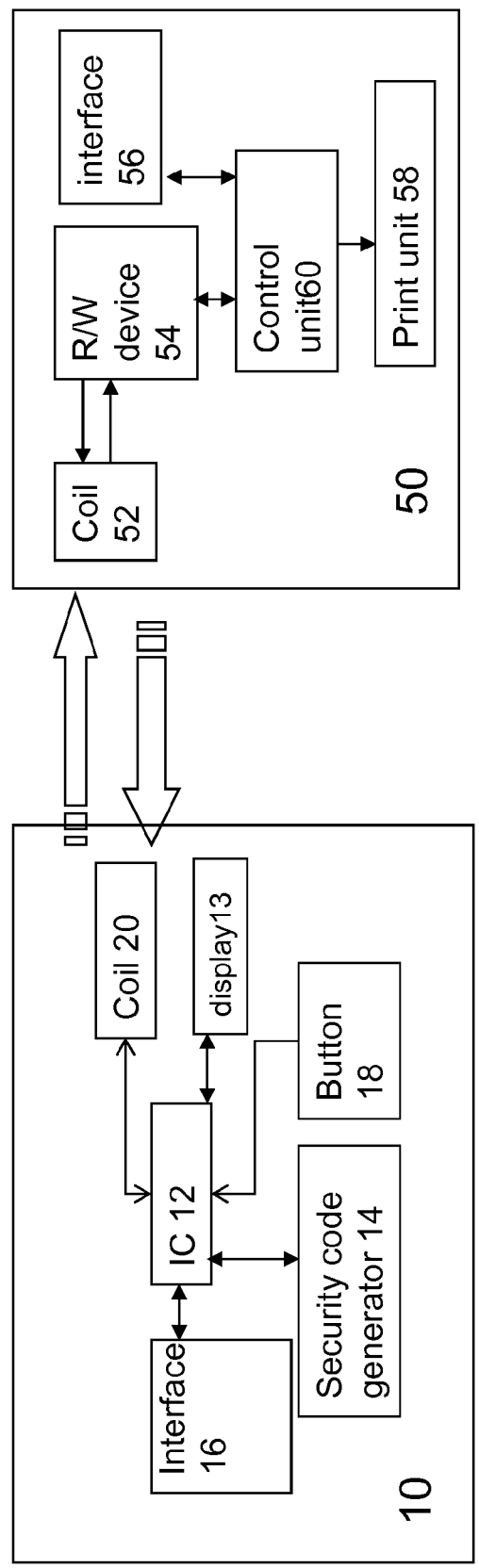

METHOD OF MONEY TRANSFER VIA A MOBILE PHONE HAVING SECURITY CODE GENERATOR

TECHNICAL FIELD

The present invention relates to a transaction card, especially, to a security transaction card and the method of the same.

BACKGROUND

In general, the transaction or credit cards are widely used for transaction. The card is approximately 84 mm×54 mm in size. The transaction card is typically used for financial, such as credit card, cash card. The web transactions are also popular day by day. In order to secure the transaction, the user should to input verified code in the web by using a separated internet banking security device. The security device generates a security code every few seconds, which you will use to log on to the business internet banking service, together with your chosen username and password. Once you have entered a code during logon, it cannot be accepted again. Because of this, the device offers increased protection against risks such as phishing and spyware. However, the security device is separated device from IC card and it is almost 40 mm×30 mm in size, and 3-5 mm in thickness. It is inconvenience to carry the device with the user.

SUMMARY

The present invention provides a transaction card having security code generator within or embedded in the card to generate security code for banking transaction verification. A transaction card comprises a substrate having an IC; an interface is coupled to the IC for signal transmission; a security code generator is coupled with the IC to generate a security code for banking transaction; an electricity generating button is coupled to the security code generator to generate the security code, a display is on the substrate and is coupled to the IC for displaying the security code. The electricity generating button includes piezoelectric material to generate electricity by piezoelectricity. The interface is contactless or contact type. The display is electronic paper, OLED, FED.

A transaction card comprises a substrate having an IC; a contact interface coupled to the IC and an external contact card reader for signal transmission; a security code generator is coupled with the IC to generate a security code for banking transaction; an button is coupled to the security code generator to generate the security code; wherein electricity for generating the security code is provided from the external contact card reader. A display is on the substrate is coupled to the IC for displaying the security code. The display is electronic paper, OLED, FED. Alternatively, the security code is transmitted to a display of an external computer through the external card reader for displaying the security code.

A transaction card includes a substrate having an IC; a contact-less interface is coupled to the IC and an external contact-less card reader for signal transmission; a security code generator is coupled with the IC to generate a security code for banking transaction; an button is coupled to the security code generator to generate the security code; wherein electricity for generating the security code is provided from the external contact-less card reader, wherein the contact-less interface includes antenna or coils. A display is on the substrate and is coupled to the IC for displaying the security code. The display is electronic paper, OLED, FED. The security code is transmitted to a display of an external computer through the external contact-less card reader for displaying the security code.

The IC or memory of the card may store the card number, effect date, user information. The antenna could be planer antenna, PIFA, fractal antenna, coils and so on

BRIEF DESCRIPTION OF THE DRAWINGS

FIG. 1 describes a contact-less IC card of the present invention.

FIG. 2 illustrates contact-less SIM card of the present invention.

DETAILED DESCRIPTION

The present invention is adaptable to credit card transaction, financial transaction, such as web transaction, automated teller machine, card reader, point of sales and personal identify.

Turning to FIG. 1, it illustrates a transaction card including substrate 10 formed of such as plastic material. For example, the thickness of the substrate is about 0.08 mm to 0.12 mm. Preferably, the card is dimensioned as the size of the current transaction card. The magnetic strip is optional for the embodiment.

As shown in the illustration, the transaction card includes IC 12 coupled to a display 13. The display 13 is located at anywhere of the card. The display maybe an electronic paper, OLED, FED (field emission display). For transaction card, the user information, account number, code, card numbers are stored into the IC (or memory in the IC) 12. The IC 12 could be a single chip, integrated chip or multiple chips. The substrate could be flexible material, transparent or non-transparent material. The IC 12 could include memory such as FLASH memory, ROM etc. in order to store information. For example, the IC (or the memory in the IC) 12 may store transaction security code generator 14 for verification or identify. The IC (or the memory in the IC) 12 may also includes but not limited to account number, user information or code. The IC 12 can be integrated with the memory. The IC card substrate 10 may include the interface 16 for communicate with the ATM or card reader by contact. The card reader may communicate with the card with/or without the interface 16. It could be applied to the point of sales (POS), ATM. The IC card could be credit card, finical card, cash card. A piezoelectric material bottom 18 is provided to activate the transaction security code generator 14 to generate the security code and provide electricity to the IC 12. The piezoelectric material bottom 18 may generate electricity while press by external force, followed by displaying the security code on the display 13. Then, the user may input the security code to the webpage displayed on the display of a computer for web transaction or ATM for verification. It is because that the piezoelectric material button 18 is used, therefore, no battery is necessary. The battery may also be optional used. Compare to the prior art, the user may omit to carry the separated security device with the user. The transaction security code may secure the safety of the transaction after logon to the business internet banking.

Another embodiment is almost the same with the last example except the power or electricity is provided from the card reader when the card is inserted into the card reader. In one example, the power is provided from the interface 16 to activate the transaction security code generator 14 to generate the security code. Therefore, the button 18 is also a trigger, no piezoelectric material involved in the example. Based on the improvement of the IC technology, it allows enough capacity to store the credit points or electronic money, even the security code generator.

In an alternative embodiment, the transaction card is NFC card as shown in FIG. 2. The interface 16 may be optional or is implanted with the antenna 20. As shown in the illustration, the transaction card includes IC 12 coupled to an antenna (or resonant coils) 20. The antenna or resonant coils 20 is located at any where of the card. For credit card, the user information, code, card numbers are stored into the IC 12 or memory. The transaction card may remove the magnetic strip or physical contact interface such as the pins on the card. The power or electricity may be provided from the wireless card reader from the antenna or resonant coils 20 or the physical interface 16. Therefore, the battery is not necessary.

Alternatively, the present invention may be incorporated into the SIM for the portable phone. The card includes I/O interface 16 coupled to the phone. The antenna or resonant coils 20 is a near field transaction antenna rather than the RF antenna of the phone. Therefore, the phone can be used as the transaction tool. Based on the features, the SIM may identify the user of the phone, it can be used as the code to identify the one who deals with the transaction. Therefore, users may use the phone embedded with the contactless card as the transaction tool for near field transaction. It may through the service party for example, communication service company, credit card center or bank to charge the transaction. Otherwise, it may download the credit points from the communication network or internet, the card acts as the payment tool or virtual cash card. The related information may be displayed and processed by the software in the phone 200 or IC, therefore, the transaction record or information could be stored or displayed. The user may be added the credit value into the card through POS system or download the coupon through the communication network or internet if the phone having the wireless module such as WiFi. It may automatically add the electronic cash value when the electronic money below the threshold.

During the operation, the contact-less reader or POS may be supplied by power and generate magnetic field or electronic current to drive the IC for fetching the information stored in the memory. The wireless power may be used to drive the security code generator to generate the security code for web banking service. Similarly, the card may receive the signal from the reader by electronic-magnetic effect. The coils 52 of the contactless reader 50 may transmit or receive signal to read/write device 54. A control unit 60 coupled to the read/write device to process the received or delivered signal. The coils maybe replaced by antenna. The contactless card reader or POS maybe connected to the terminal server and coupled to the control unit 60 through the internet interface 56 for interchanging the information with the database. A printing unit 58 is optional coupled to the control unit 60 in order to print the transaction receipt. Typically, the contactless or contact card reader is coupled to a computer to engage with the banking service.

The invention may be applied to ATM. Therefore, it is a contact-less ATM including cash drawing unit and/or depositing unit for drawing or depositing money. A control unit is provided to control the input signal and coupled to the main frame (not shown) for transaction identification and data query. A memory may couple to the control unit. A cash storage is used to store cash and coupled to the cash drawing unit and/or depositing unit through cash delivery. The contact-less ATM includes a contact-less read-writer coupled to the contact-less signal transmitter and the control unit for near field wireless transaction. The ATM will couple to the terminal for identification while transaction. It may also include the contact reader for conventional usage. It may couple to the terminal database for information exchange.

The present invention disclosed a transaction method through mobile terminal such as smart mobile phone, or tablet computer. The method includes the step of implanting a contact-less transaction card, credit card or cash card into the mobile device such as mobile phone, or tablet. The contact-less transaction card includes a transmitter or the contact-less card is coupled to a transmitter. Alternatively, the security code generator is embedded in the mobile device memory or in above IC card to generate the security code which can be displayed on the mobile device display. The user may transact with other party by attaching the mobile terminal (phone) to the contact-less card reader by transmit the transaction signal from the antenna of the contact-less card or the mobile device antenna. The contact-less transaction card is an independent card to the SIM card or it could be integrated with the SIM card. In one case, the antenna or the coils is set within the card, within the SIM card, within the internal of the phone or outside of the phone to avoid the EM shielding effect.

The present invention discloses a contact-less transaction method, it includes steps of providing a transaction card which is contact-less or contact type. The card is interactive with a wired card reader or wireless card reader, and the security code generator is activated by the card reader to generate security code for web banking service. The method includes step of contact-less attaching the credit card to the card reader for transmitting signals contactless, wherein the contact-less transaction card includes IC coupled to the transmitter (antenna). It may store or record the user information or transaction information.

The present invention discloses a contact-less financial transaction method, it includes steps of providing a contact-less transaction card and contact-less ATM, wherein the contact-less transaction card and contact-less ATM includes a signal transmitter, respectively. The method includes step of wirelessly attaching the transaction card to the ATM for transmitting signals wirelessly to process the transfer, depositing or drawing via the contact-less transaction, wherein the contact-less transaction card includes IC coupled to the transmitter (such as antenna or coils). It may store or record the user information, bank information, password, account information or transaction information. The contactless card reader of the ATM provides power to the contact-less card to the security code generator generate security code.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure. While the preferred embodiment of the invention has been illustrated and described, it will be appreciated that various changes can be made therein without departing from the spirit and scope of the invention.

The invention claimed is:
1. A mobile phone having transaction tool comprising:
a transaction IC embedded into said mobile phone;
a NFC antenna or coil coupled to said transaction IC for transaction signal transmission;
a transaction security generator coupled with said IC to generate a transaction security for communication between said transaction IC and an external card reader;

a generating trigger coupled to said transaction security generator to generate said transaction security, wherein said transaction security generator being activated by said external card reader to generate said transaction security; and
a display.

2. The mobile phone of claim 1, wherein said generated transaction security is displayed on said display of said mobile phone.

3. The mobile phone of claim 1, further comprising a memory coupled to said transaction IC for storing transaction record.

4. The mobile phone of claim 1, wherein said mobile phone includes a software to process a transaction information.

5. The mobile phone of claim 1, wherein said card reader is a wireless card reader.

6. The mobile phone of claim 1, wherein an ATM having a card reader which is interactive with said transaction IC, and said transaction security generator being activated by said card reader to generate transaction security.

7. The mobile phone of claim 6, wherein said card reader is a wireless card reader.

8. A mobile phone having a transaction tool comprising:
a transaction IC embedded into said mobile phone;
a NFC antenna or coil coupled to said transaction IC for transaction signal transmission;
a transaction security generator coupled with said IC to generate a transaction security for communication between said transaction IC and an external card reader;
a generating trigger coupled to said transaction security generator to generate said transaction security, wherein said transaction security generator is activated by a said external card reader to generate transaction security;
a software coupled to said transaction IC to process a transaction information;
a memory coupled to said transaction IC for storing a transaction record; and
a display.

9. The mobile phone of claim 8, wherein said financial transaction card is incorporated into a SIM for a portable phone.

10. The mobile phone of claim 8, wherein said generated transaction security is displayed on said display of said mobile phone.

11. The mobile phone of claim 8, wherein said card reader is a wireless card reader.

* * * * *